United States Patent
Arcese et al.

(10) Patent No.: US 8,195,608 B2
(45) Date of Patent: Jun. 5, 2012

(54) FILE SYNCHRONIZATION BETWEEN MULTIPLE NODES

(75) Inventors: Mauro Arcese, Rome (IT); Michele D'urso, Rome (IT); Luca Gimondo, Rome (IT)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 12/472,900

(22) Filed: May 27, 2009

(65) Prior Publication Data

US 2009/0300071 A1 Dec. 3, 2009

(30) Foreign Application Priority Data

Jun. 2, 2008 (EP) ..................... 08157387

(51) Int. Cl.
*G06F 7/00* (2006.01)
*G06F 17/00* (2006.01)
*H04J 3/06* (2006.01)
*G06F 15/16* (2006.01)
*G06F 12/00* (2006.01)
*G06F 17/30* (2006.01)

(52) U.S. Cl. ......... 707/634; 370/503; 709/201; 707/827

(58) Field of Classification Search ................. 707/201, 707/634, 827; 370/503; 709/201
See application file for complete search history.

(56) References Cited

U.S. PATENT DOCUMENTS

| | | | |
|---|---|---|---|
| 6,938,042 B2 * | 8/2005 | Aboulhosn et al. | ................... 1/1 |
| 7,631,155 B1 * | 12/2009 | Bono et al. | ..................... 711/156 |
| 2005/0198565 A1 | 9/2005 | McChrystal | |
| 2005/0234943 A1 | 10/2005 | Clarke | |
| 2008/0005195 A1 | 1/2008 | Li | |
| 2008/0317068 A1 * | 12/2008 | Sagar et al. | ................... 370/503 |
| 2009/0006307 A1 * | 1/2009 | Wolf et al. | ........................ 707/1 |

OTHER PUBLICATIONS

Tech-Pro, Inc.; "How to: Synchronize Files on Two Computers"; 2009; http://www.tech-pro.net/howto_033.html.
Tech-Pro, Inc.; "AJC Directory Synchronizer;" 2009; http://www.tech-pro.net/ajcdirsync.html.
Microsoft Corp.; "SyncToy: The Smart Way to Copy Files;" Mar. 26, 2006; http://www.microsoft.com/windowsxp/using/digitalphotography/prophoto/synctoy/mspx.
Rsync; "The Rsync Utility"; http://samba.anu.edu.au/rsync/.
International Business Machines Corp.; "IBM Tivoli Configuration Manager and Tivoli Provisioning Manager for Software Coexistence and Migration Considerations," The Tivoli Configuration Manager 4.2.3, pp. 220-221; 2007; http://www.redbooks.ibm.com/redbooks/pdfs/sg247426.pdf.

(Continued)

*Primary Examiner* — Shew-Fen Lin
*Assistant Examiner* — Christy Lin
(74) *Attorney, Agent, or Firm* — D'Ambrosio & Menon, PLLC; Usha Menon; Srikant Viswanadham

(57) ABSTRACT

Methods and products for storing data for synchronizing one or more files between two or more nodes. One embodiment of the method includes commencing to create a metadata object associated with a file to be synchronized: determining a file location on the or each node; adding the file location of the or each node to the metadata object such that the metadata object includes details relating to the file and the location thereof in one or more of the two or more nodes; and making the metadata object available to predetermined users via a central server.

14 Claims, 4 Drawing Sheets

OTHER PUBLICATIONS

International Business Machines Corp.; "How Does Autopack Work?;" https://publib.boulder.ibm.com/tividd/td/ITCM/SC23-4711-00/en_US/HTML/swd42ugmst104.htm.

International Business Machines Corp; "The DB2 Content Manager 8;" http://www.1.ibm.com/support/docview.wss?rs=2218&uid=swg27005845.

* cited by examiner

200

Notes.data.directory = "RegValue (HKEY_LOCAL_MACHINE\SOFTWARE\Lotus\Notes\7.0\DataPath)"
NAME = mydb.nsf
LOCATION = "${Notes.data.directory}/"
ACL = "user1, Administrator, User2"
PUBLISHER_NAME = "User1"
PUBLISHER_NODE = "node.ibm.com"
CRC = 15243

202

NAME = "myDocument.doc"
LOCATION = "$(USERPROFILE)\My Documents"
ACL = "user1, Administrator, User2"
PUBLISHER_NAME = "User2"
PUBLISHER_NODE = "node1.ibm.com"
CRC = 481653

204 my.data.directory = "CfgFileValue($(windir)/config.ini;section=data;key=data_directory)"

NAME = "myDocument.doc"

LOCATION = "${my.data.directory}/"

ACL = "user1, Administrator, User2"

PUBLISHER_NAME = "User2"

PUBLISHER_NODE = "node1.ibm.com"

*Fig. 2*

FILE SYNCHRONIZATION BETWEEN MULTIPLE NODES

PRIORITY

This application is based on and claims the benefit of priority from European Patent Application No. 08157387.5, filed Jun. 2, 2008.

BACKGROUND

Many computer users have a laptop, a desktop, and sometimes a personal digital assistant (PDA). If the user generates documents on one device, it is not uncommon that the user may wish to have the most up-to-date version of the same document on one of the other devices. The synchronization of files between one device and another, in which the user specifies a specific source and destination file or directory to enable the synchronization to take place may be referred to as peer-to-peer (P2P) file sharing.

SUMMARY

Embodiments are disclosed for storing data for synchronizing files at one or more nodes. One embodiment includes creating a metadata object associated with a file to be synchronized; determining a location for the file at a target node; adding a target-independent representation of the determined file location to the metadata object such that the metadata object includes details relating to the file and the target-independent representation of the file representing a location of the file at each of the nodes; and making the metadata object available to predetermined users via a central metadata server Another method embodiment includes downloading the metadata object to one of the nodes; identifying the originating node for the file from the metadata object; downloading the file from the originating node for use at the node; and updating the metadata object.

The foregoing and other objects and features of the disclosure will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2 is an example of representations of a metadata object in accordance with an embodiment of the invention.

DETAILED DESCRIPTION

Figure 1:
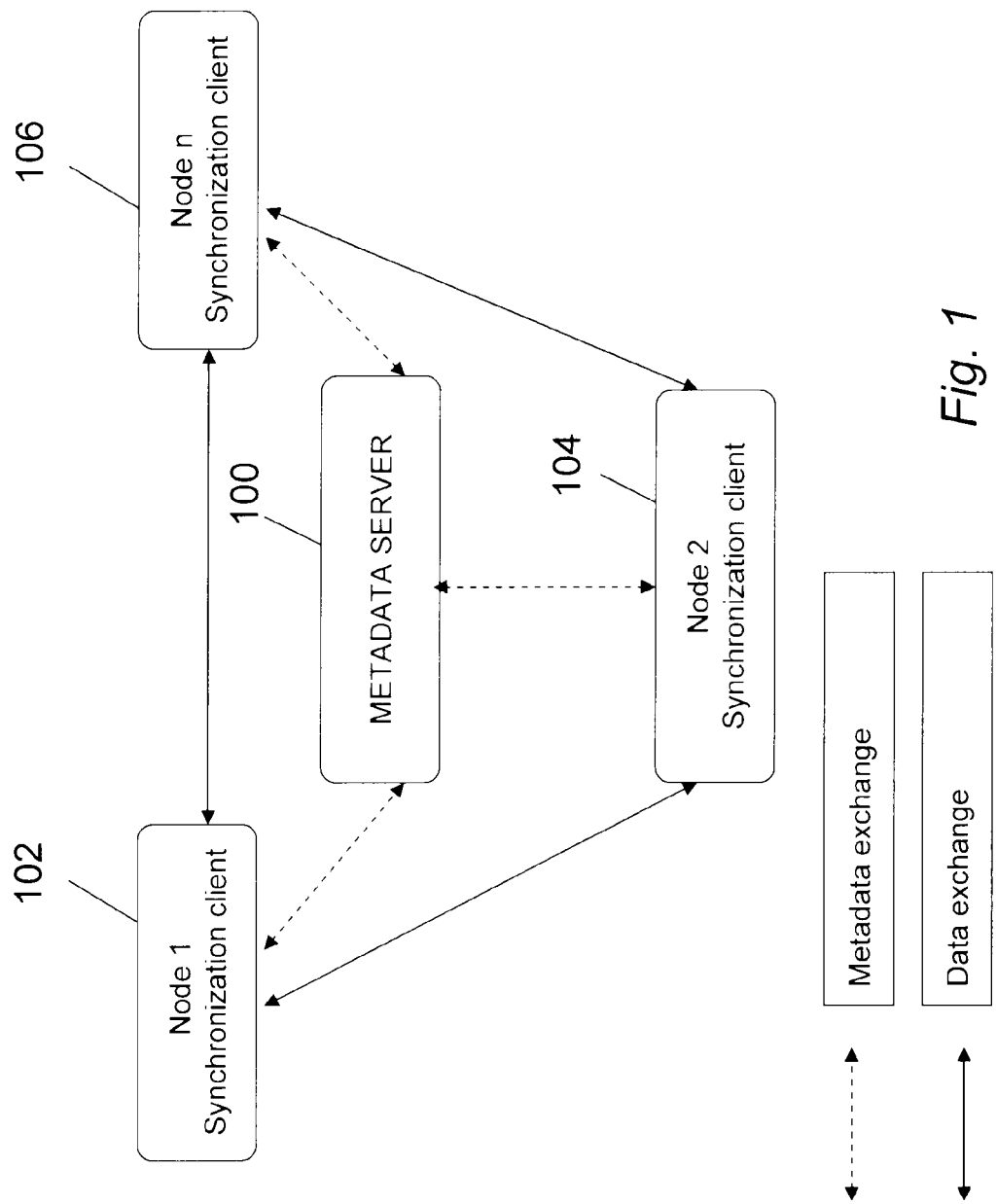
FIG. 1 is a block diagram of a system and process in accordance with an embodiment of the invention.

Referring to FIG. 1, a system according to an embodiment of the present invention will now be described. The system includes a metadata server (100) and a number of nodes, such as, for example, node 1 (102), node 2 (104), and node n (106). A node is also referred to as a synchronization client. In addition to the system elements identified above, the system also includes a metadata object.

In accordance with one embodiment of the present invention, the metadata object is a set of information that enables unique identification of a file or files that are to be kept synchronized, along with the context where the file or files may be used. The information contained in the metadata object is computer independent and enables location of the same file on each computer where it is to be kept synchronized. The information stored in the metadata object, includes, but is not limited to, the following: filename: file location: an access control list (ACL) which specifies which users have access to the file; the username and node name of the file publisher; and a cyclic redundancy check (CRC) for the file. A cyclic redundancy check is a type of error detecting code which can be used for many purposes, including the ability to detect and check alterations or changes to a file after it has been stored.

The metadata object includes information relating to the location of the file on a target machine (the file location information for a specific computer). The file location information may be represented as a signature that allows the system to locate the target position of the file. This may include, for example, the bookmarks on a web browser, the address book of an e-mail application, a document, a database, and so on. FIG. 2 shows exemplary representations of the location information for different files. Example 1 (200) illustrates how a Windows registry can be used to locate the file. Example 2 (202) illustrates the use of an environment variable to locate a directory. Example 3 (204) illustrates the use of a properties file to locate a director. Each of these will now be described in greater detail below.

The notation $(xxx) is representative of a property defined in the metadata itself. The notation $(yyy) is representative of an environment variable. An environment variable may include, for example, USERPROFILE, windir, SystemRoot, ProgramFiles, etc. There are a number of different possibilities that can be used to define these properties as identified in the example above. For example 1, the metadata object may refer to Windows registry keys; for example 2, the metadata object may refer to environment variables; and for example 3, the metadata object may make reference to a specific value of the property defined in, for example, an .ini file.

Once generated, the metadata object is stored on the metadata server (100) as shown in FIG. 1. This metadata server (100) is accessible to all nodes in the network and is the central storage repository for all metadata objects relating to any shared files that are to be kept synchronized. The metadata server (100) provides the capability of at least uploading, removing, updating and querying metadata objects. In some implementations, the metadata server (100) may comprise multiple servers. The above-mentioned synchronization client (located in each of the nodes in FIG. 1) is a service that runs on the node and manages the synchronization activities between the client, the metadata server and any other nodes in the network.

In operation, embodiments of the system carry out at least one of two methods: a method relating to the publishing and updating of a file (or group of files, directories etc.); and a method relating to the synchronization of files (or groups of files, directories etc.).

Figure 3:
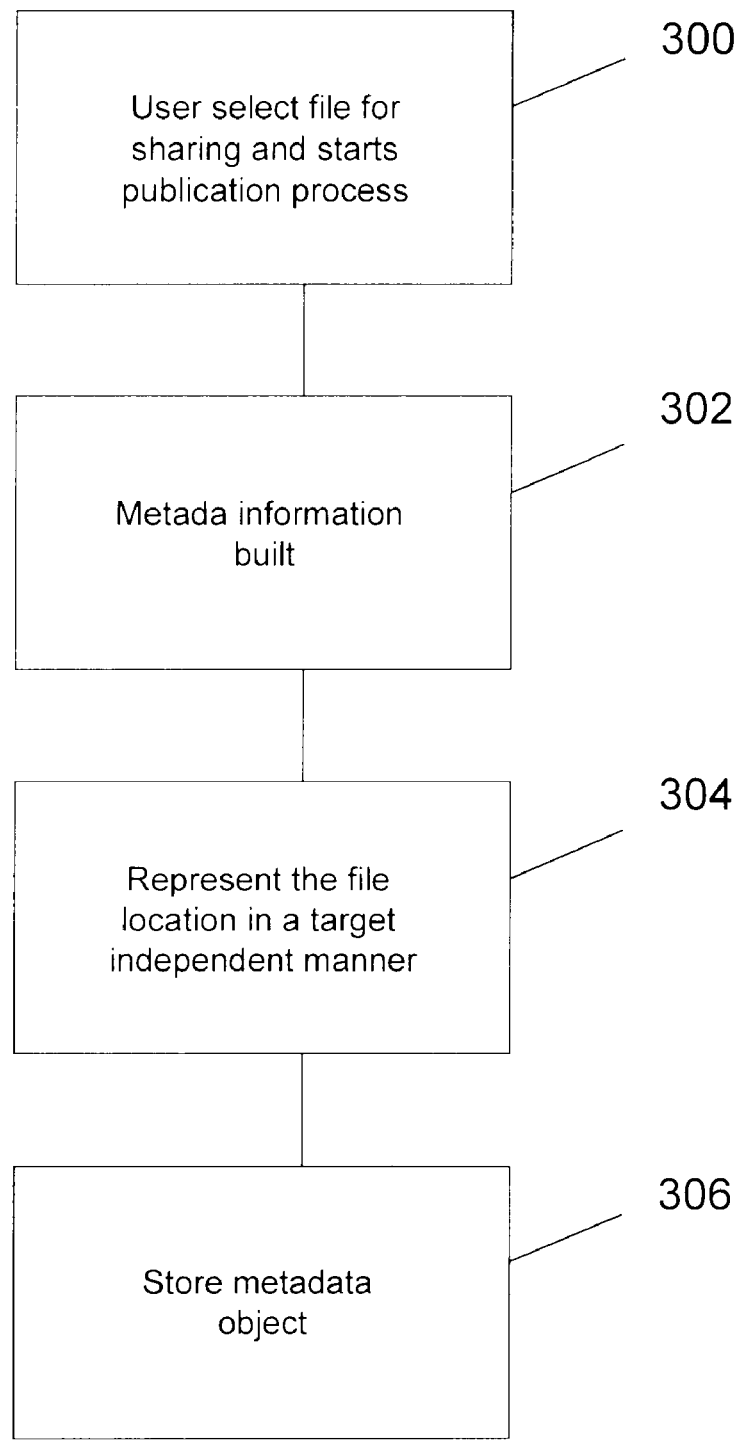
FIG. 3 is a block diagram showing a first stage of the method steps in accordance with an embodiment of the invention.

Referring to FIG. 3, publishing of a file according to one embodiment of the invention will now be described. The process enables a user to share files, directories, etc. with machines other than that on which the file originated. At step (300) the user selects the file or files (or directories) for sharing and starts the publication process in accordance with an embodiment of the present invention. At step (302) the synchronization client builds the metadata information for the file selected by the user. As part of this step, step (304) determines how to represent the file location in a target independent manner.

The creation of such target-independent locations may be carried out in a number of different ways. For example, the system may attempt to match the path (or at least part of the path) of the file with a known location, such as, for example, a system variable. This may be achieved as the system tries to determine if part of the path of a given file can be represented through a system variable. For example, the file "c:/Windows/swdis.ini" could be represented in this way: "$(windir)swdis.ini" where "windir" is the name of a system variable provided by the Windows operating system.

The system may attempt to scan the Windows registry to find values that contained the path (or part of the path) of the file. The system may scan the .ini files and/or properties files to find a value that contains the path (or part of the path) of the file. Alternatively, an application may register a plug-in with the synchronization client that is queried each time a file is published. If the application recognizes that the file is part of the application itself, it may generate and provide the necessary metadata information. In this way it is possible to avoid unnecessary performance of registry and file system scans.

It will be appreciated there may be many other alternatives by which the location of a file may be determined and the above mentioned examples are not intended to be limitative in any way. Any scans of the Windows registry keys or the file system may be restricted to certain subsets of these in order to reduce the amount of data to be analyzed. Information relating to such restrictions may also be stored in a metadata object.

During step (304), if a match is found then the metadata object can be automatically built. If more than one match is found or if the system is unable to automatically detect the necessary metadata information, the user may be prompted to select the correct match or enter a specific location or path. Optionally, if the published file is an executable file, such as a .exe or a .dll file the system could also retrieve additional properties, such as the product name, product version, and so on to resolve any conflict when more than one match is found.

If a prompt to the user is generated by the system, this may be carried out prior to publication of the file. The publication might only be implemented once an administrator knows the working environment well and does not expect there to be any missing or mistaken information.

Returning to FIG. 3, at step (306) the client system connects to the metadata server in order to make publicly available the metadata of the file or files originally selected by the user. If any metadata object for the same file already exists on the server this indicates that the file and associated metadata object have already been published. In this case, the system updates the CRC, the publisher name and publishing node of the metadata object that is currently stored on the metadata server. If a metadata object for this file does not exist on the server, then the system creates it. In any case a copy of the metadata object is stored locally on the synchronization client on the node from which the connection in step (306) is established.

If a copy of the CRC is stored in relation to a local metadata object, which is different from the CRC of the metadata object downloaded from the metadata server, the original user is notified of the change. This is due to the fact that the user updating the CRC is attempting to publish a new version of the file that is not the last one. In other one words a user (either the original or someone else) has published a new version of the file to the metadata server that is different from the currently stored version.

Figure 4:
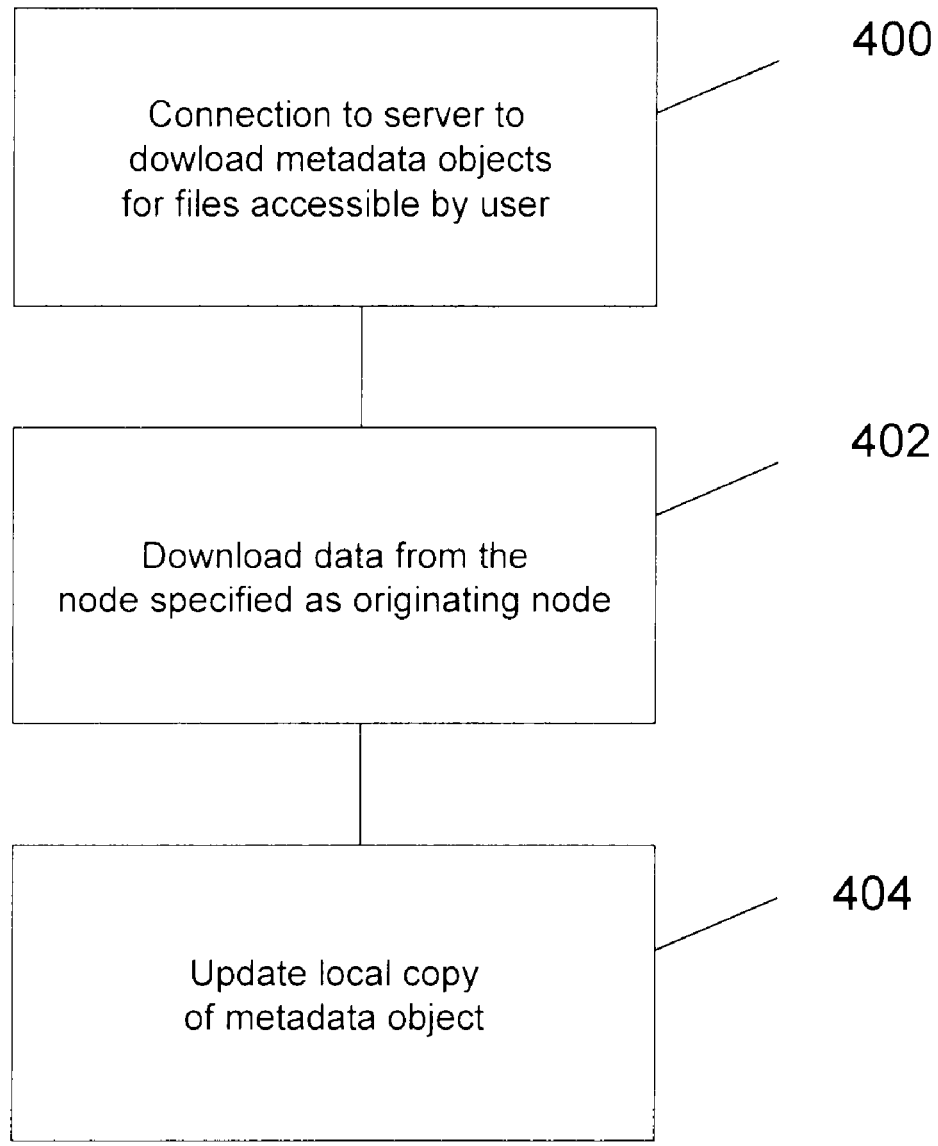
FIG. 4 is a block diagram showing a second stage of the method steps in accordance with an embodiment of the invention.

Once the metadata objects have seen stored on the metadata server, synchronization of a file (or a group of files or directories) may be carried out at any time. This will now be described with reference to FIG. 4. At step (400) a connection is made from a node being used by the user to the metadata server. This is to facilitate download of the complete list of metadata objects for files accessible by the user according to the ACL. At step (402), based on the current location of the user, for each local file that does not exist or that has a CRC different from the one specified in the downloaded metadata, the file (or files or directories) may then be accessed from the node specified as the originating node for the file. Data and metadata can be downloaded from the originating node to the current location of the user based on the metadata information downloaded in step (400). An update of the local copy of the metadata object may also need to be made, as is shown at step (404). It may be possible to execute a synchronization in which the user is prompted to approve each modified file in order to determine whether or not to download a file. This will be based on the overall list of metadata objects.

Embodiments of the present invention may automatically synchronize sets of files (or directories) between multiple nodes, provide automatic discovery and management of the target location, and/or provide semi-automatic detection of the source location when building metadata information. The present method and system can be used with or incorporated into any products that manage file replication (e.g., content management systems). Known systems may be adapted to carry out the intelligent method and system of the present disclosure. This adaptation may be carried out by adding components to current content management systems such as, for example, a shared library (e.g., a dll. file or a jar file) that contains all the essential features. The library may be loaded by an appropriate system and the functionality may be enabled by calling the methods exported by such a library. From a user perspective there are different ways to expose the functionality. For example, functionality may be provided by means of pop-up menus that are displayed when the user right-clicks on a specific file on the files system, by actions available on one of the menus of an application, and so on.

It will be appreciated that the above exemplary embodiments are for illustration and that other embodiments will occur to those of skill in the art. For example, the steps may take place in different orders. Software modules, which may be used to implement embodiments of the invention while executing on one or more computer systems, may be structured differently than discussed above and may include additional modules or functions, or modules may be combined. The memory structures may be of other types, or may be replaced with equivalent entities, not necessarily consisting of physical storage media. The invention may be implemented in any form suitable to be used by or in connection with any data processing system, such as a computer program product embodied as external or resident software, firmware, or microcode (either in object code or in source code). Moreover, the program may be provided on any computer-usable medium; the medium can be any element suitable to contain, store, communicate, propagate, or transfer the program. Examples of such media include non-transitory media such as— fixed disks (where the program can be pre-loaded), removable disks, tapes, cards, and the like; for example, the medium may be of the electronic, magnetic, optical, or semiconductor type. Examples of such media also include transitory media such as networks and media, for example, of the electromagnetic or infrared type.

An exemplary computer system. such as the metadata server and client computers used in embodiments of the present invention may have a CPU and a main memory, which are connected to a bus. The bus may be connected to a display device such as an LCD monitor via a display controller. In addition. the bus may be connected to a storage device such as, for example, a hard disk, silicon disk, CD, DVD or other various drives via an IDE or SATA controller. The storage device may contain the computer program product above for execution by the CPU.

It should be understood that the inventive concepts disclosed herein are capable of many modifications. To the extent such modifications fall within the scope of the appended claims and their equivalents, they are intended to be covered by this patent.

What is claimed is:

1. A computer-implemented method for synchronizing files at one or more nodes, the method comprising:
    determining a filepath that represents a location at a target node of a file to be synchronized;
    generating a metadata object associated with the file to be synchronized, the generating a metadata object comprising:
        generating a target-independent representation of the file location that enables the file to be located at each node where the file is stored, and generating publishing node information that identifies the target node as a publishing node of the metadata object,
        wherein the generated metadata object comprises the target-independent representation of the file location and the publishing node information;
        the generating a target-independent representation of the file location comprising:
            determining whether a shared filepath representation exists for the filepath representing the location of the file at the target node, the shared filepath representation being common to all nodes where the file is stored, and
            responsive to a determination that the shared filepath representation exists, generating the target-independent representation from the shared filepath representation;
    publishing the metadata object to a central metadata server to enable access to the file at each node where the file is stored using the target-independent representation; and
    updating the metadata object associated with the file on the condition that the file is changed at any node where the file is stored, the updating comprising updating the publishing node information to identify the node storing the changed file as the publishing node.

2. The method of claim 1 wherein the metadata object further comprises:
    details relating to the file to be kept synchronized, the details including the file name and file location;
    an access control list (ACL) that specifies those users who are permitted access to the file; and
    a cyclic redundancy check (CRC) for the file.

3. The method of claim 2 wherein updating the metadata object further comprises:
    updating the CRC included in the metadata object; and
    notifying at least the target node that the file associated with the metadata object has been changed.

4. The method of claim 2 further comprising:
    establishing a connection between a node and the central metadata server;
    downloading the metadata object from the central server to the node, the metadata object being associated with a file accessible by a user of the node in accordance with the access control list associated with the file;
    determining a location of the file at the publishing node using the target-independent representation of the file location included in the metadata object; and
    downloading the file from the publishing node if one of the following conditions is satisfied:
        the file is not stored on the node, or
        the file is stored on the node and a CRC associated with a local copy of the
        metadata object differs from the CRC associated with the metadata object
        downloaded from the server.

5. The method of claim 4 wherein determining the location of the file at the publishing node comprises matching a system variable with at least a portion of a file path included in the target independent representation of the file location.

6. The method of claim 4 wherein determining the location of the file at the publishing node comprises scanning file properties in a predetermined location.

7. The method of claim 4 wherein determining the location of the file at the publishing node comprises scanning registry files at a predetermined location.

8. A computer program product for storing data for synchronizing files at one or more nodes, the computer program product comprising:
    a non-transitory computer-readable medium having computer usable program code embodied therewith, the computer usable program code comprising:
    computer program instructions for determining a file path that represents a location at a target node of a file to be synchronized;
    computer program instructions for generating a metadata object associated with the file to be synchronized, the computer program instructions for generating a metadata object comprising:
        computer program instructions for generating a target-independent representation of the file location that enables the file to be located at each node where the file is stored, and
        computer program instructions for generating publishing node information that identifies the target node as a publishing node of the metadata object,
        wherein the generated metadata object comprises the target-independent representation of the file location and the publishing node information;
        the computer program instructions for generating a target independent representation of the file location comprising:
            computer program instructions for determining whether a shared filepath representation exists for the filepath representing the location of the file at the target node, the shared filepath representation being common to all nodes where the file is stored, and
            computer program instructions for generating the target-independent representation from the shared filepath representation responsive to a determination that the shared representation exists;
    computer program instructions for publishing the metadata object to a central metadata server to enable access to the file at each node where the file is stored using the target-independent representation; and
    computer program instructions for updating the metadata object associated with the file on the condition that the file is changed at any node where the file is stored, the updating comprising updating the publishing node information to identify the node storing the changed file as the publishing node.

9. The computer program product of claim 8 wherein the metadata object further comprises:
   details relating to the file to be kept synchronized, the details including the file name and file location;
   an access control list (ACL) that specifies those users who are permitted access to the file; and
   a cyclic redundancy check (CRC) for the file.

10. The computer program product of claim 9, the computer program instructions for updating the metadata object further comprising:
   computer program instructions for updating the CRC included in the metadata object; and
   computer program instructions for notifying at least the target node that the file associated with the metadata object has been changed.

11. The computer program product of claim 9 further comprising:
   computer program instructions for establishing a connection between a node and the central metadata server;
   computer program instructions for downloading the metadata object from the central server to the node, the metadata object being associated with a file accessible by a user of the node in accordance with the access control list associated with the file;
   computer program instructions for determining a location of the file at the publishing node using the target-independent representation of the file location included in the metadata object; and
   computer program instructions for downloading the file from the publishing node if one of the following conditions is satisfied:
      the file is not stored on the node, or
      the file is stored on the node and a CRC associated with a local copy of the metadata object differs from the CRC associated with the metadata object downloaded from the server.

12. The computer program product of claim 11, the computer program instructions for determining the location of the file at the publishing node comprising computer program instructions for matching a system variable with at least a portion of the filepath included in the target independent representation of the file location.

13. The computer program product of claim 11, the computer program instructions for determining the location of the file at the publishing node comprising computer program instructions for scanning file properties in a predetermined location.

14. The computer program product of claim 11, the computer program instructions for determining the location of the file at the publishing node comprising computer program instructions for scanning registry files at a predetermined location.

\* \* \* \* \*